United States Patent
Lillard et al.

(10) Patent No.: US 11,893,091 B2
(45) Date of Patent: Feb. 6, 2024

(54) DISTRIBUTED SYSTEMS FOR INTELLIGENT RESOURCE PROTECTION AND VALIDATION

(71) Applicant: BANK OF AMERICA CORPORATION, Charlotte, NC (US)

(72) Inventors: Elliott Leonard Lillard, Denver, CO (US); Regina Yee Cadavid, San Gabriel, CA (US); Gloria Youngsook Joo, Moorpark, CA (US); Jinyoung Nathan Kim, Charlotte, NC (US); Ramkumar Korlepara, McKinney, TX (US); Nia Mack, Prosper, TX (US); Philip Lone Mintac, Charlotte, NC (US); Srilekha Mudumbai Srinivasa, Murphy, TX (US); Michael Jacob Richardson, Chicago, IL (US); Brandon Sloane, Indian Land, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 128 days.

(21) Appl. No.: 17/240,849

(22) Filed: Apr. 26, 2021

(65) Prior Publication Data
US 2022/0342958 A1    Oct. 27, 2022

(51) Int. Cl.
| | |
|---|---|
| H04L 29/06 | (2006.01) |
| G06F 21/10 | (2013.01) |
| G06F 16/27 | (2019.01) |
| G06F 16/583 | (2019.01) |
| H04L 9/40 | (2022.01) |
| G06F 16/51 | (2019.01) |

(52) U.S. Cl.
CPC .............. *G06F 21/10* (2013.01); *G06F 16/27* (2019.01); *G06F 16/51* (2019.01); *G06F 16/583* (2019.01); *H04L 63/0428* (2013.01); *G06F 21/1015* (2023.08)

(58) Field of Classification Search
CPC ........ G06F 21/10; G06F 16/27; G06F 16/583; G06F 16/51; G06F 2221/0713; H04L 63/0428
See application file for complete search history.

(56) References Cited

U.S. PATENT DOCUMENTS

| | | |
|---|---|---|
| 7,188,138 B1 | 3/2007 | Schneider |
| 7,761,583 B2 | 7/2010 | Shull et al. |
| 8,285,830 B1 | 10/2012 | Stout et al. |
| 8,826,154 B2 | 9/2014 | Dixon et al. |

(Continued)

*Primary Examiner* — Shin-Hon (Eric) Chen
(74) *Attorney, Agent, or Firm* — Moore & Van Allen PLLC; Nicholas C. Russell (57) ABSTRACT

Embodiments of the invention are directed to systems, methods, and computer program products for providing intelligent analysis of technical and non-technical data to validate instances of permitted use of such brand elements and generate alerts for instances of non-permitted use of such brand elements. The system provides a single portal view for upload of relevant data and transmission of analysis results. The invention utilizes a permissioned distributed register database architecture for the secure storage and tokenization of brand elements and retrieval of validation and ownership information. The invention further includes the capability to recommend and automate remedial measures to prevent continued unauthorized use of brand elements.

20 Claims, 6 Drawing Sheets

(56) References Cited

U.S. PATENT DOCUMENTS

| | | | |
|---|---|---|---|
| 10,108,954 B2 | 10/2018 | Dunlevy et al. | |
| 10,387,889 B1* | 8/2019 | Hanna | G06Q 50/01 |
| 10,565,358 B1* | 2/2020 | Bertsch | H04L 9/3239 |
| 10,951,626 B2 | 3/2021 | Simons | |
| 10,958,663 B2 | 3/2021 | Simons | |
| 11,270,318 B1* | 3/2022 | Schwarz | G06F 21/10 |
| 2013/0254179 A1 | 9/2013 | Tan | |
| 2015/0154720 A1 | 6/2015 | Matkowsky | |
| 2016/0055490 A1 | 2/2016 | Keren et al. | |
| 2016/0253679 A1* | 9/2016 | Venkatraman | G06Q 30/0185 |
| | | | 705/310 |
| 2018/0285984 A1 | 10/2018 | Ayachitula et al. | |
| 2018/0307744 A1 | 10/2018 | Gadekar et al. | |
| 2019/0005595 A1 | 1/2019 | Tautenhan et al. | |
| 2019/0122317 A1 | 4/2019 | Hunn et al. | |
| 2019/0130508 A1* | 5/2019 | Lantz | G06N 7/01 |
| 2019/0303623 A1 | 10/2019 | Reddy et al. | |
| 2019/0303893 A1* | 10/2019 | Ramasamy | G06K 7/10366 |
| 2020/0110858 A1* | 4/2020 | Lyu | G06N 20/00 |
| 2020/0250683 A1 | 8/2020 | Padmanabhan et al. | |
| 2020/0372594 A1* | 11/2020 | Li | G06Q 50/184 |
| 2021/0027404 A1* | 1/2021 | de Bold | H04L 9/50 |
| 2021/0037008 A1* | 2/2021 | Swaminath | H04L 9/3247 |
| 2022/0245223 A1* | 8/2022 | Castelão Soares | |
| | | | H04L 63/1483 |

* cited by examiner

DISTRIBUTED SYSTEMS FOR INTELLIGENT RESOURCE PROTECTION AND VALIDATION

BACKGROUND

An entity's brand can be expressed or represented using a variety of technical and non-technical elements. The identification of these brand elements is important to track against authorized hosted technologies in order to identify any unauthorized use by external parties. Currently, there is no ideal aggregator of both the technical and non-technical brand intel into a centralized storage and remediation mechanism. A more intelligent and cohesive solution is needed to properly address these issues.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The systems and methods described herein address the above needs by providing intelligent analysis of technical and non-technical data to identify and categorize use of entity brand elements as authorized or unauthorized, and to provide brand element validation through the use of a distributed register of information. Brand elements may include typical marks such as images, logos, or colors, but also technical elements including Domain Name System (DNS) information, digital certificates, Uniform Resource Locators (URLs), or the like. If unauthorized uses of brand elements are identified by the system, the system may provide recommendations to the controlling entity for remediation. The system provides a single portal view of aggregated publicly accessible information and usage information for brand elements of the entity. At a high level, these components may include a brand element inventory tool, active brand tracking agents, aggregation and notification mechanisms, distributed ledger storage mechanisms, or automated remediation mechanisms.

In some implementations, brand element tracking agents are deployed as both resident on specific elements, and in some embodiments may also be deployed as programs for gathering and analyzing data across a range of data sources both inclusive of common and known platforms (e.g., popular websites, social media platforms, or the like). In some embodiments, brand tracking agents may also be deployed for use on more non-traditional platforms (such as internet relay chat channels or distributed networks). The identification of data sources will vary widely across each implementation and it is important to note that the system is intended to process a wide array of types of information from existing brand element tracking solutions that may exist.

In some embodiments, an internally managed and locally decentralized private blockchain is proposed as decentralized and trusted storage solution. It is understood that in such embodiments, the owning organization or entity of the brand elements will have authority to sign or write to the chain, producing faster output and offering privacy and security to the contents of the chain. In other implementations, for example, where one or more third party entities or organizations utilize the present invention, it may be preferable to employ a federated blockchain retaining the benefits of a truly decentralized storage mechanism, but offering selective permissioned access to the contents of the distributed ledger, distributed register, or the like, to such third parties.

It is important to note that preferred embodiments of the proposed system are distinct from some other blockchain implementations in that only internal trusted nodes that are under the control of the entity systems have the authority to add new records to the blockchain ledger. In this way the entity can ensure that there will be no outside tampering or manipulation of the distributed register.

Furthermore, it is understood that, in the signing ledger, specific metadata information and signing protocols may be employed which are unique to the entity. This ensures that each implementation of a brand validation blockchain or distributed register database will be unique and that no other organization can (intentionally or unintentionally) replicate the same chain. Additionally, since the proposed implementation is inherently linked to a brand element inventory tool, there is typically a validation step that can be performed against a current ledger with the element inventory tool. For instance, in some implementations, this validation step can occur automatically and continuously over time as the brand element inventory tool compares the metadata and associated tokenized information of various potential brand elements to verify ownership, certified distribution or use, or the like.

The present invention also includes a publicly or semi-publicly accessible feature or "portal" wherein one or more entities or users may utilize the system for verification purposes. In some embodiments, this may be a public facing portal which allows a user to upload or scan a particular image or brand element. The portal will then process the image, extract the embedded blockchain signature, and then either forward the signature to a processing system or process it locally on the extracting server. The processing system will compare the embedded blockchain signature with the distributed register and validate that the image and signature match, and that this particular image is in fact one which is owned by the entity. This response is then presented back to the requesting user thereby giving them an authoritative response as to whether their particular document which contains this image has been properly signed and distributed.

The publicly facing portal also provides a way to ascertain if entity branding is being used by third parties without explicit permission. The process to identify data that contains entity brands or intellectual property in the past has been limited by existing technology to identify brand elements and trademark elements using text (e.g., searching for a particular text string, or the like). The identification of the visual brand elements in the past has been a manual, labor-intensive task. This is currently unsustainable, particularly as third party partnerships with large entities expand.

Embodiments of the invention relate to systems, methods, and computer program products for enhanced brand element protection and automated response, the invention including: transmit information to a user device, wherein the information comprises display information for an application portal; receive uploaded image data from the user device via the application portal; process the received uploaded image data and extract metadata from the uploaded image data; compare the extracted metadata to data stored in a distributed register database comprising multiple nodes; based on comparison of the extracted metadata to the data stored in the distributed register database, validate ownership and permitted use of the uploaded image data; and transmit a response to the user device via the application portal, wherein the response comprises an indication that the uploaded image data is permitted for use. In some embodiments, the uploaded image data further comprises an image and a description of the usage of the image including location and one or more entity identifiers.

In some embodiments, metadata comprises an embedded distributed register or blockchain signature, image size, pixel data, file type, NFT identifier, wallet address, custody information, or location of access.

In some embodiments, the invention is further configured to: based on comparison of the extracted metadata to the data stored in the distributed register database, fail to validate ownership and permitted use of the uploaded image data; and transmit an alternate response to the user device via the application portal, wherein the response comprises an indication that the uploaded image data is not permitted for use.

In some embodiments, the alternate response further comprises a message that unauthorized or unpermitted use has been escalated for administrative review.

In some embodiments, the system is further configured to transmit data between the system and the user device using end-to-end encryption.

In some embodiments, the uploaded image data further comprises a link to a website, domain, or location of one or more images.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" or "managing entity" as used herein may refer to any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, or the like. The account is associated with and/or maintained by the entity. In other embodiments, an entity may not be a financial institution. In still other embodiments, the entity may be the merchant itself.

"Entity system" or "managing entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"User" as used herein may refer to an individual associated with an entity. As such, in some embodiments, the user may be an individual having past relationships, current relationships or potential future relationships with an entity. In some instances, a "user" is an individual who has a relationship with the entity, such as a customer or a prospective customer. Accordingly, as used herein the term "user device" or "mobile device" may refer to mobile phones, personal computing devices, tablet computers, wearable devices, and/or any portable electronic device capable of receiving and/or storing data therein and are owned, operated, or managed by a user.

"Transaction" or "resource transfer" as used herein may refer to any communication between a user and a third party merchant or individual to transfer funds for purchasing or selling of a product. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

A "brand element" as described herein may refer to marks such as images, logos, or colors which are owned by or registered for exclusive use to a specific entity or person. In some embodiments, brand elements may also vitally include various technical elements including Domain Name System (DNS) information, digital certificates, Uniform Resource Locators (URLs), or the like, which may not typically be easily visually identified by human review as belonging to a specific entity without actively cross-referencing a registry, database, or list of technical brand elements and their respective owners or registrants.

"Agent" as used herein may refer to a computer program or device with the ability to actively collect, gather, scrape, extract, or otherwise infer information related to the usage of a brand element. In preferred embodiments, agents typically must also include such technology that keeps an inventory of all entity-issued certificates for brand element usage and verification, as well as include the ability for provenance tracking for downstream certificate issuance. "Portal" as used herein may refer to a computer program, web-accessible page, mobile application, or the like used to interact with the entity systems, process potential brand element data, and retrieve, compare, or analyze information extracted from a distributed register database.

The system allows for use of a machine learning engine to intelligently identify information retrieved by agents as potentially indicating use or display of brand elements. The machine learning engine may be used to analyze historical data in comparison to potential uses of brand elements in order to determine a likelihood of a brand element being present. The machine learning engine may also be used to generate intelligent aggregation of similar data based on metadata comparison of technical and non-technical brand elements, which in some cases may be used to generate a graph database visualization of such similarities.

In some embodiments, an internally managed and locally decentralized private blockchain is proposed as decentralized and trusted storage solution, or "distributed register database." It is understood that in such embodiments, the owning organization or entity of the brand elements will have authority to sign or write to the chain, producing faster output and offering privacy and security to the contents of the chain. In other implementations, for example, where one or more third party entities or organizations utilize the present invention, it may be preferable to employ a federated blockchain retaining the benefits of a truly decentralized storage mechanism, but offering selective permissioned access to the contents of the distributed ledger, distributed register, or the like, to such third parties.

It is important to note that preferred embodiments of the proposed system are distinct from some other blockchain implementations in that only internal trusted nodes that are under the control of the entity systems have the authority to add new records to the blockchain ledger. In this way the entity can ensure that there will be no outside tampering or manipulation of the distributed register.

Furthermore, it is understood that in the signing ledger, specific metadata information and signing protocols may be employed which are unique to the entity. This ensures that each implementation of a brand validation blockchain or distributed register database will be unique and that no other organization can (intentionally or unintentionally) replicate the same chain. Additionally, since the proposed implementation is inherently linked to a brand element inventory tool, there is typically a validation step that can be performed against a current ledger with the element inventory tool. For instance, in some implementations, this validation step can occur automatically and continuously over time as the brand element inventory tool compares the metadata and associated tokenized information of various potential brand elements to verify ownership, certified distribution or use, or the like.

The present invention also includes a publicly or semi-publicly accessible feature or "portal" wherein one or more entities or users may utilize the system for verification purposes. In some embodiments, this may be a public facing portal which allows a user to upload or scan a particular image or brand element. The portal will then process the image, extract the embedded blockchain signature, and then either forward the signature to a processing system or process it locally on the extracting server. The processing system will compare the embedded blockchain signature with the distributed register and validate that the image and signature match, and that this particular image is in fact one which is owned by the entity. This response is then presented back to the requesting user thereby giving them an authoritative response as to whether their particular document which contains this image has been properly signed and distributed.

The publicly facing portal also provides a way to ascertain if entity branding is being used by third parties without explicit permission. The process to identify data that contains entity brands or intellectual property in the past has been limited by existing technology to identify brand elements and trademark elements using text (e.g., searching for a particular text string, or the like). The identification of the visual brand elements in the past has been a manual, labor-intensive task. This is currently unsustainable, particularly as third party partnerships with large entities expand.

Figure 1:
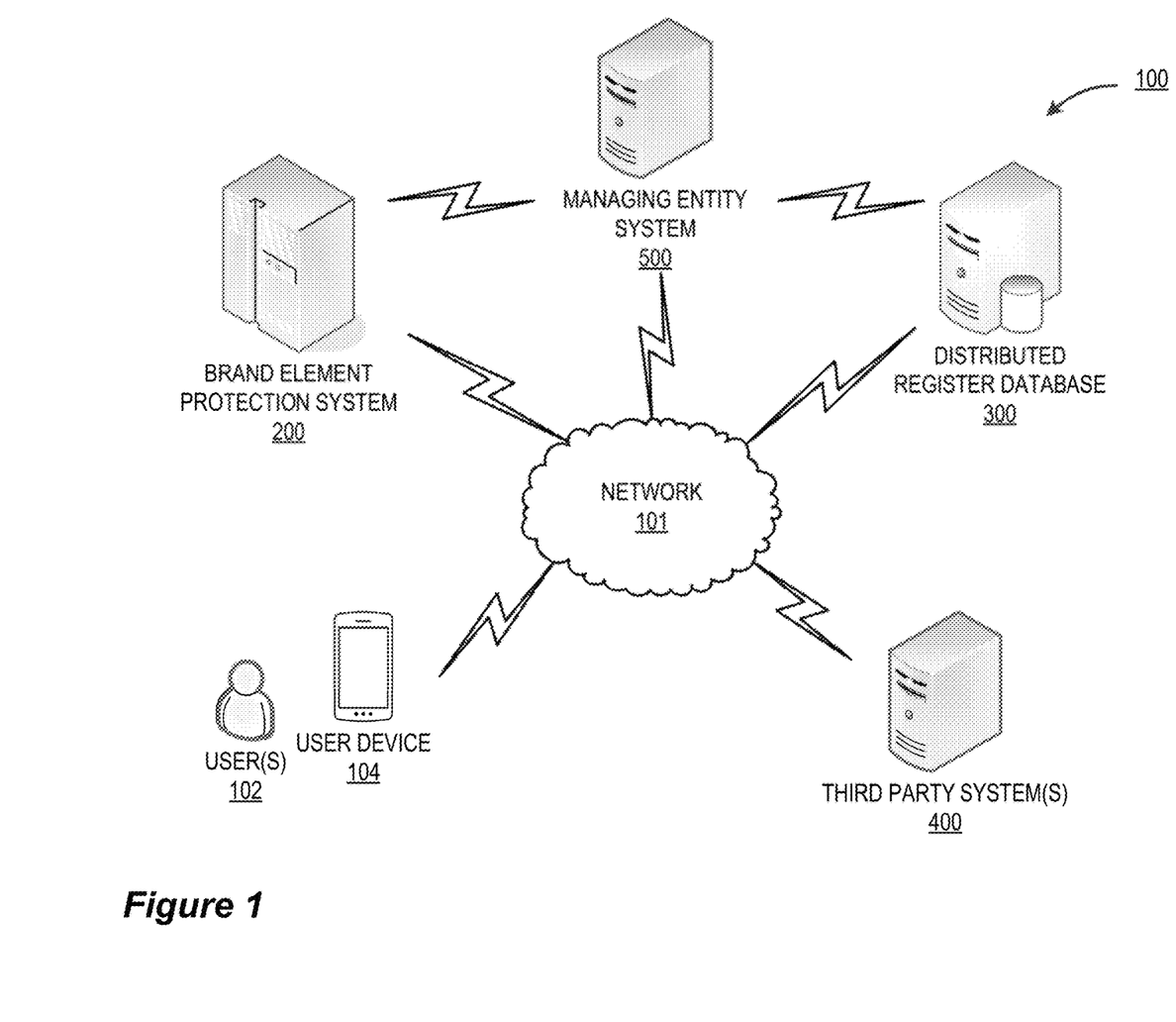
FIG. 1 illustrates an operating environment for the brand element protection system, in accordance with some embodiments of the invention.

FIG. 1 illustrates an operating environment for the brand element protection system, in accordance with one embodiment of the present disclosure. As illustrated, the operating environment 100 may comprise a user 102 and/or a user device 104 in operative communication with one or more third party systems 400 (e.g., web site hosts, registry systems, third party entity systems, or the like). The operative communication may occur via a network 101 as depicted, or the user 102 may be physically present at a location separate from the various systems described, utilizing the systems remotely. The operating environment also includes a managing entity system 500, a brand element protection system 200, a distributed register database 300, and/or other systems/devices not illustrated herein and connected via a network 101. As such, the user 102 may request information from or utilize the services of the brand element protection system 200, or the third party system 400 by establishing operative communication channels between the user device 104, the managing entity system 500, and the third party system 400 via a network 101.

Typically, the brand element protection system 200 and the distributed register database 300 are in operative communication with the managing entity system 500, via the network 101, which may be the internet, an intranet or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between the user device 104 and the third party system 400). In this regard, the wireless communication channel may further comprise near field communication (NFC), communication via radio waves, communication through the internet, communication via electromagnetic waves and the like.

The user device 104 may comprise a mobile communication device, such as a cellular telecommunications device (i.e., a smart phone or mobile phone), a computing device such as a laptop computer, a personal digital assistant (PDA), a mobile internet accessing device, or other mobile device including, but not limited to portable digital assistants (PDAs), pagers, mobile televisions, laptop computers, cameras, video recorders, audio/video player, radio, GPS devices, any combination of the aforementioned, or the like. The user device is described in greater detail with respect to FIG. 3.

The managing entity system 500 may comprise a communication module and memory not illustrated, and may be configured to establish operative communication channels with a third party system 400 and/or a user device 104 via a network 101. The managing entity may comprise a brand element data repository 256 which stores brand element data 257 (e.g., a database of brand elements and associated metadata, authorized uses, authorized parties, authorized formats for use, identified uses, unauthorized use history, records of remedial measures taken, or the like). The brand element data repository 256 may also contain user data. This user data may be used by the managing entity to authorize or validate the identity of the user 102 for accessing the system (e.g., via a username, password, biometric security mechanism, 2 factor authentication mechanism, or the like). In some embodiments, the managing entity system is in operative communication with the brand element protection system 200 and distributed register database 300 via a private communication channel. The private communication channel may be via a network 101 or the brand element protection system 200 and distributed register database 300 may be fully integrated within the managing entity system 500, such as a virtual private network (VPN), or over a secure socket layer (SSL).

The managing entity system 500 may communicate with the brand element protection system 200 in order to transmit data associated with observed brand element usage by or via a plurality of third party systems 400. In some embodiments, the managing entity may utilize the features and functions of the brand element protection system to initialize remedial measures in response to identifying unauthorized usage of brand elements. In other embodiments, the managing entity and/or the one or more third party systems may utilize the brand element protection system via a portal or application in order to query the distributed register database 300 for verification purposes. In some embodiments, this may be a public facing portal which allows a user to upload or scan a particular image or brand element. The portal will then process the image, extract the embedded blockchain signature, and then either forward the signature to the brand element protection system 200 for processing.

The brand element protection system 200 may compare an embedded blockchain signature of the brand element or image data with the data from the distributed register database 300 and validate that the image and signature match, and that this particular image is in fact one which is owned by the entity. In doing do, the brand element protection system 200 may process and validate non-fungible tokens (NFTs) on the distributed register database which correspond to unique tokenized data on the distributed register, and which may be verified as to their authenticity, custody, ownership, or the like. This response is then presented back to the requesting user thereby giving them an authoritative response as to whether their particular document which contains the brand element is authentic, or has been properly authorized for use, signed, distributed, or the like.

The publicly facing portal of the brand element protection system 200 may also provide a way to ascertain if entity branding is being used by third parties without explicit permission. The process to identify data that contains entity brands or intellectual property in the past has been limited by existing technology to identify brand elements and trademark elements using text (e.g., searching for a particular text string, or the like). The identification of the visual brand elements in the past has been a manual, labor-intensive task. This is currently unsustainable, particularly as third party partnerships with large entities expand.

Figure 2:
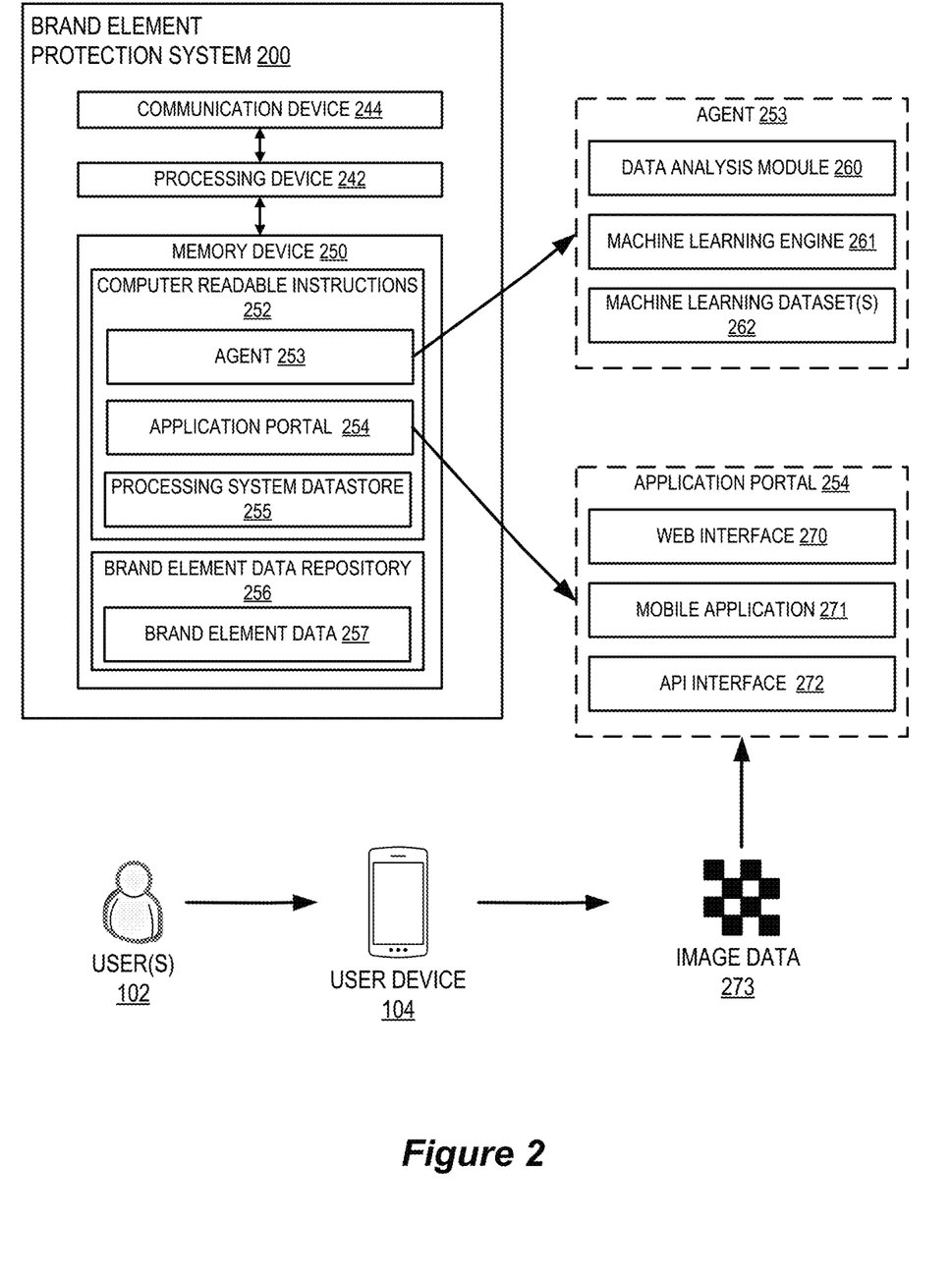
FIG. 2 is a block diagram illustrating the brand element protection system, in accordance with some embodiments of the invention.

FIG. 2 illustrates a block diagram of the brand element protection system 200 associated with the operating environment 100, in accordance with embodiments of the present invention. As illustrated in FIG. 2, the brand element protection system 200 may include a communication device 244, a processing device 242, and a memory device 250 having an agent module or "agent" 253, an application portal 254 and a processing system datastore 255 stored therein. As shown, the processing device 242 is operatively connected to and is configured to control and cause the communication device 244, and the memory device 250 to perform one or more functions. In some embodiments, the agent module 253 and/or the application portal 254 comprises computer readable instructions that when executed by the processing device 242 cause the processing device 242 to perform one or more functions and/or transmit control instructions to the distributed register database 300, the managing entity system 500, or the communication device 244. It will be understood that the agent 253 or the application portal 254 may be executable to initiate, perform, complete, and/or facilitate one or more portions of any embodiments described and/or contemplated herein. The agent 253 may comprise executable instructions associated with data processing and analysis related to brand elements and may be embodied within the application portal 254 in some instances. The brand element protection system 200 may be owned by, operated by and/or affiliated with the same managing entity that owns or operates the managing entity system 500. In some embodiments, the brand element protection system 200 is fully integrated within the managing entity system 500.

The agent 253 may further comprise a data analysis module 260, a machine learning engine 261, and a machine learning dataset(s) 262. The data analysis module 260 may store instructions and/or data that may cause or enable the brand element protection system 200 to receive, store, and/or analyze data received by the managing entity system 500 or the distributed register database 300. The data analysis module may process data to identify brand elements categories or brand element identifier data which it can then use to locate the appropriate tokenized brand element data on the distributed register database 300. The machine learning engine 261 and machine learning dataset(s) 262 may store instructions and/or data that cause or enable the brand element protection system 200 to determine, in real-time and based on received information, instances of brand element use, as well as whether or not the use is authorized or unauthorized by the managing entity based on comparison to data stored in the distributed register database 300. In some embodiments, the machine learning engine 261 and machine learning dataset(s) 262 may store instructions and/or data that cause or enable the brand element protection system 200 to determine, in real-time and based on received information, a recommended remedial measure to be taken against unauthorized or non-permitted brand element usage. The machine learning dataset(s) 262 may contain data extracted or scraped from publicly viewable or accessible sources of information via network 101, such as image data taken from a web page, URL line, or the like. In other embodiments, the machine learning dataset 262 may include submitted image data 273 or other brand element data submitted by a user 102 via the application portal 254. The distributed register database 300 may also contain metadata related to instances of brand element usage (e.g., location, time, associated party, data format, color, certificate value, hash value, private key, ownership information, wallet address, permitted uses, royalties or payments for use, or the like). In some embodiments, the machine learning dataset(s) 262 may also contain data relating to user activity or device information, which may be stored in a user account managed by the managing entity system. In some embodiments, the agent 253 may act as a data interjector for submitting proposed data records to the distributed register database 300. In some embodiments, image data of a brand element initially submitted by the agent 253 may be tokenized and stored on the distributed register as a unique token, which may be referred to as a non-fungible token ("NFT").

The machine learning engine 261 may receive data from a plurality of sources and, using one or more machine learning algorithms, may generate one or more machine learning datasets 262. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. It is understood that additional or alternative machine learning algorithms may be used without departing from the invention.

The machine learning datasets 262 may include machine learning data linking one or more details of brand element usage to identify one or more factors indicating whether or not the brand element is authorized for the specific use. For instance, the machine learning datasets 262 may include data linking a particular brand element to a particular set of parties, uses, time periods, formats, situations, or the like in which the brand element is authorized for use. Thus, this data may enable the brand element protection system 200 to identify with a percentage likelihood that a specific use of a brand element by a particular party in a particular manner either is or is not authorized by the managing entity. The data associated with a brand element or its instance of use may be supplemented by additional data obtained from the managing entity system 500 or third party systems 400. For example, in some embodiments, the system may determine, based on location data obtained from a third party system 400 server, that the location (e.g., geographic location, URL location, server address, or the like), of the brand element instance of use is not authorized by the managing entity. In other embodiments, the agent may rely on data from a third party system 400 such as a registry or domain name server which may authenticate a certificate of use of a particular brand element. that a user is in closer proximity to a first third party merchant than a second third party merchant. The brand element protection system 200 may weight that information accordingly to determine that the likelihood that a particular instance of brand element usage may be unauthorized.

The application portal 254 may further comprise a web interface 270, a mobile application 271, or an API interface 272. In some embodiments, the user 102 may submit image data 273 via the user device 104 via the one or more components of the application portal 254. In this way, the brand element protection system 200 may receive submissions from one or more users 102 in the form of potential brand elements in image data 273, and may further use the capabilities of the agent 253 in order to communicate with the distributed register database for identification, comparison, and analysis of authenticity, ownership, custody, or permitted uses of one or more brand elements contained within the image data 273. It is understood that the application portal may interact with the user device 104 via a web interface 270, mobile application 271, or an API interface 272, and in some embodiments a portion, complementary component, or all of each of these application portal aspects may exist locally on the user device as an entity application 1048 or user application 351, as discussed in FIG. 3.

The communication device 244 may generally include a modem, server, transceiver, and/or other devices for communicating with other devices on the network 101. The communication device 244 may be a communication interface having one or more communication devices configured to communicate with one or more other devices on the network 101, such as the brand element protection system 200, the user device 104, other processing systems, data systems, etc.

Additionally, the processing device 242 may generally refer to a device or combination of devices having circuitry used for implementing the communication and/or logic functions of the brand element protection system 200. For example, the processing device 242 may include a control unit, a digital signal processor device, a microprocessor device, and various analog-to-digital converters, digital-to-analog converters, and other support circuits and/or combinations of the foregoing. Control and signal processing functions of the brand element protection system 200 may be allocated between these processing devices according to their respective capabilities. The processing device 242 may further include functionality to operate one or more software programs based on computer-executable program code 252 thereof, which may be stored in a memory device 250, such as the application portal 254 and the agent 253. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 242 may be configured to use the network communication interface of the communication device 244 to transmit and/or receive data and/or commands to and/or from the other devices/systems connected to the network 101.

The memory device 250 within the brand element protection system 200 may generally refer to a device or combination of devices that store one or more forms of computer-readable media for storing data and/or computer-executable program code/instructions. For example, the memory device 250 may include any computer memory that provides an actual or virtual space to temporarily or permanently store data and/or commands provided to the processing device 242 when it carries out its functions described herein.

Figure 3:
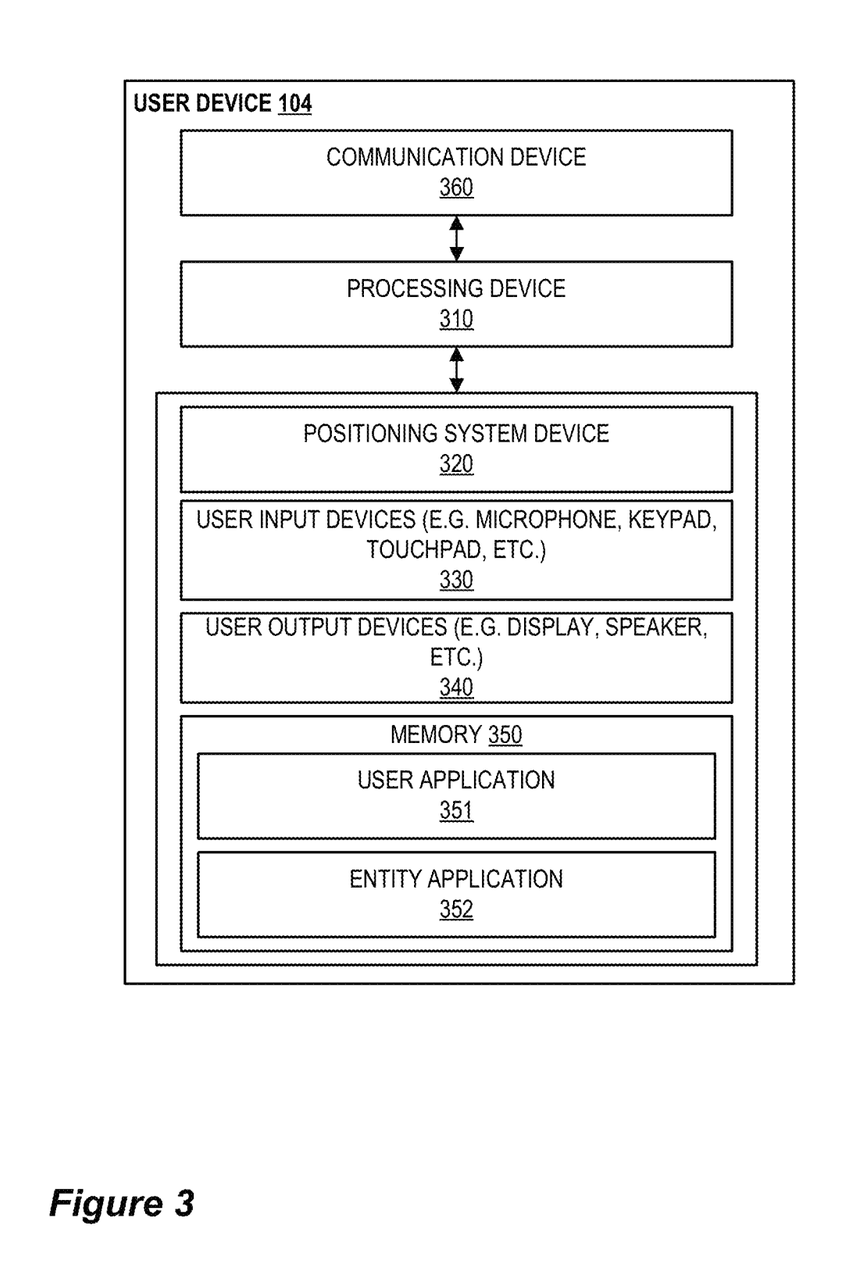
FIG. 3 is a block diagram illustrating a user device associated with the brand element protection system, in accordance with some embodiments of the invention.

FIG. 3 illustrates a block diagram of the user device associated with the brand element protection system, in accordance with embodiments of the present invention. The user device 104 may include a user mobile device or the like. A "mobile device" 104 may be any mobile communication device, such as a cellular telecommunications device (i.e., a cell phone or mobile phone), personal digital assistant (PDA), a mobile Internet accessing device, or another mobile device including, but not limited to portable digital assistants (PDAs), pagers, mobile televisions, laptop computers, cameras, video recorders, audio/video player, radio, GPS devices, any combination of the aforementioned devices.

The user device 104 may generally include a processing device or processing device 1042 communicably coupled to devices such as, a memory device 1046, user output devices 1045 (for example, a user display or a speaker), user input devices 1044 (such as a microphone, keypad, touchpad, touch screen, and the like), a communication device or network interface device 360, a positioning system device 1043, such as a geo-positioning system device like a GPS device, an accelerometer, and the like, one or more chips, and the like.

The processing device 1042 may include functionality to operate one or more software programs or applications, which may be stored in the memory device 320. For example, the processing device 1042 may be capable of operating applications such as a user application 351, an entity application 1048, or a web browser application. The user application 351 or the entity application may then allow the user device 104 to transmit and receive data and instructions to or from the third party system 400, brand element protection system 200, and the managing entity system 500, and display received information via a graphical user interface of the user device 104. The user application 1047 may further allow the user device 104 to transmit and receive data to or from the managing entity system 500 (for example, via wireless communication or NFC channels), data and instructions to or from the brand element protection system 200, web content, such as, for example, location-based content and/or other web page content, according to a Wireless Application Protocol (WAP), Hypertext Transfer Protocol (HTTP), and/or the like. The user application 1047 may allow the managing entity 500 to present the user 102 with a plurality of recommendations, identified trends, suggestions, brand element data, pattern data, graph data, statistics, and/or the like for the user.

The processing device 1042 may be configured to use the communication device 1041 to communicate with one or more devices on a network 101 such as, but not limited to the third party system 400, the brand element protection system 200, and the managing entity system 500. In this regard the processing device 1042 may be configured to provide signals to and receive signals from the communication device 1041. The signals may include signaling information in accordance with the air interface standard of the applicable BLE standard, cellular system of the wireless telephone network and the like, that may be part of the network 101. In this regard, the user device 104 may be configured to operate with one or more air interface standards, communication protocols, modulation types, and access types. By way of illustration, the user device 104 may be configured to operate in accordance with any of a number of first, second, third, and/or fourth-generation communication protocols and/or the like. For example, the user device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 104 may also be configured to operate in accordance with non-cellular communication mechanisms, such as via a wireless local area network (WLAN) or other communication/data networks. The user device 104 may also be configured to operate in accordance Bluetooth® low energy, audio frequency, ultrasound frequency, or other communication/data networks.

The communication device 1041 may also include a user activity interface presented in user output devices 1045 in order to allow a user 102 to execute some or all of the processes described herein. The application interface may have the ability to connect to and communicate with an external data storage on a separate system within the network 101. The user output devices 1045 may include a display (e.g., a liquid crystal display (LCD) or the like) and a speaker 334 or other audio device, which are operatively coupled to the processing device 1042. The user input devices 1044, which may allow the user device 104 to receive data from the user 102, may include any of a number of devices allowing the user device 104 to receive data from a user 102, such as a keypad, keyboard, touch-screen, touchpad, microphone, mouse, joystick, other pointer device, button, soft key, and/or other input device(s).

The user device 104 may also include a memory buffer, cache memory or temporary memory device 1046 operatively coupled to the processing device 1042. Typically, one or more applications 351 and 352, are loaded into the temporarily memory during use. As used herein, memory may include any computer readable medium configured to store data, code, or other information. The memory device 1046 may include volatile memory, such as volatile Random Access Memory (RAM) including a cache area for the temporary storage of data. The memory device 420 may also include non-volatile memory, which can be embedded and/or may be removable. The non-volatile memory may additionally or alternatively include an electrically erasable programmable read-only memory (EEPROM), flash memory or the like.

In some instances, various features and functions of the invention are described herein with respect to a "system." In some instances, the system may refer to the brand element protection system 200 performing one or more steps described herein in conjunction with other devices and systems, either automatically based on executing computer readable instructions of the memory device 250, or in response to receiving control instructions from the managing entity system 500. In some instances, the system refers to the devices and systems on the operating environment 100 of FIG. 1. The features and functions of various embodiments of the invention are be described below in further detail.

It is understood that the servers, systems, and devices described herein illustrate one embodiment of the invention. It is further understood that one or more of the servers, systems, and devices can be combined in other embodiments and still function in the same or similar way as the embodiments described herein.

Figure 4:
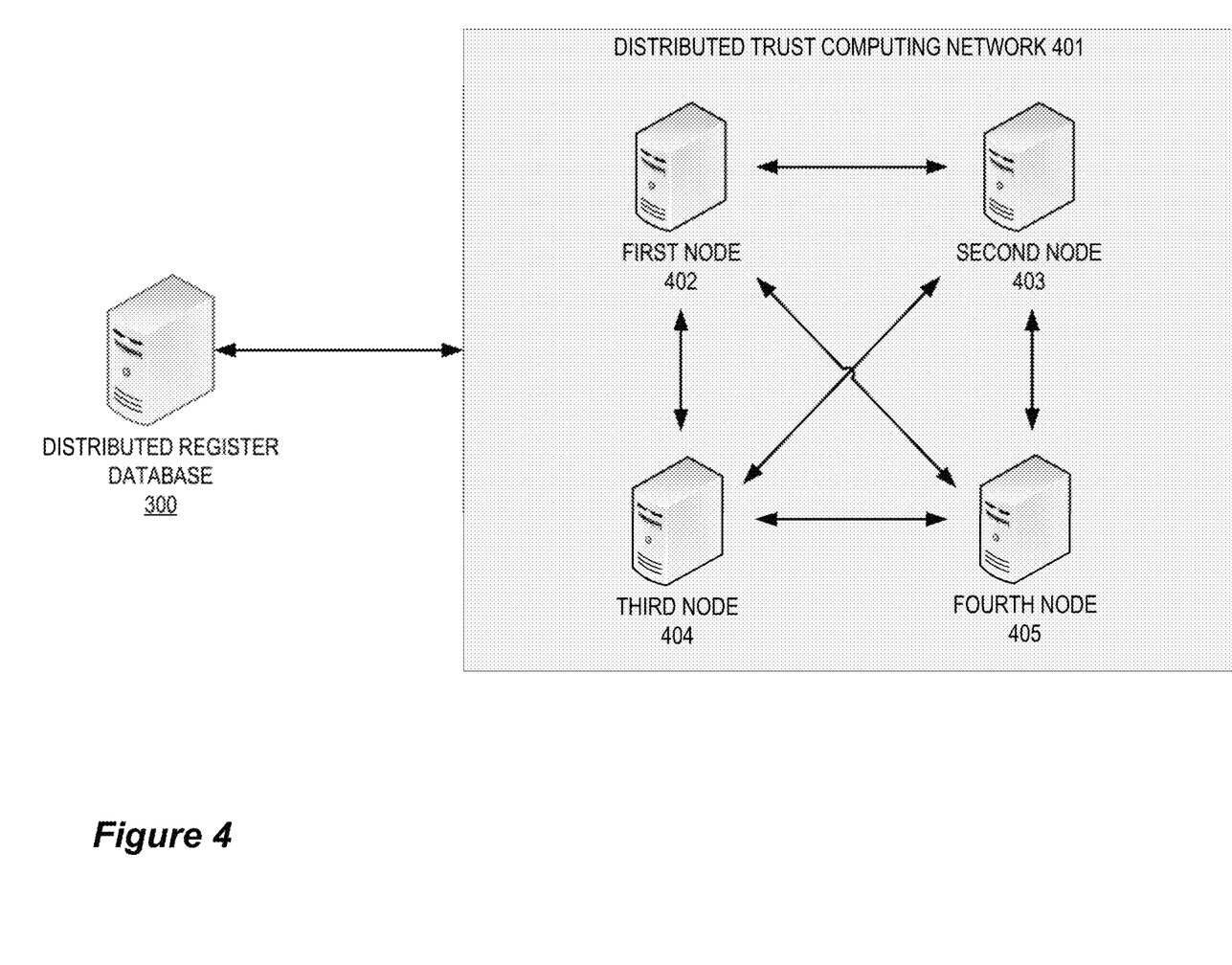
FIG. 4 is a block diagram illustrating an operating environment for the distributed trust computing network, in accordance with some embodiments of the invention.

FIG. 4 is a block diagram illustrating an operating environment for the distributed trust computing network 401, in accordance with some embodiments of the present disclosure. In particular, the operating environment may include a plurality of distributed register nodes 402, 403, 404, and 405 in operative communication with one another within the distributed trust computing network 401. The distributed trust computing network 401, as well as other networks as described herein, may operate communicatively between nodes using a global area network (GAN), such as the Internet, a wide area network (WAN), a local area network (LAN), or any other type of network or combination of networks. The network may provide for wireline, wireless, or a combination wireline and wireless communication between devices on the network.

The first distributed register node 402, the second distributed register node 403, the third distributed register node 404, and the fourth distributed register node 405 may be computing systems which host the brand element register repository (also referred to herein more generally as the "distributed register"). In some embodiments, the distributed register may comprise the data for all brand elements within the entity system. Accordingly, the distributed register nodes 402, 403, 404, and 405 are typically networked terminals or servers, but may also be desktop computers, laptops, smartphones or smart devices, IoT devices, or the like, or any combination thereof. Typically, each distributed register node 402, 403, 404, and 405 hosts a complete copy of the distributed register. The contents of the various copies of the distributed register hosted on the distributed register nodes 402, 403, 404, and 405 may be updated to be consistent with one another via a consensus algorithm executed by the distributed register nodes 402, 403, 404, and 405. In this way, a complete and verified copy of the distributed register may remain accessible even if the copy of the distributed register stored on one or more distributed register nodes 402, 403, 404, and 405 become inaccessible (e.g., due to being offline, experiencing high network latency, or the like) or corrupted (e.g., due to hardware/software errors, unauthorized modification of distributed register contents, or the like). It is understood that while four nodes are depicted in the embodiment shown in FIG. 3, there may be any number of nodes ("N" number of nodes) which make up the distributed trust computing network 401 and operate to validate entries and maintain a complete copy of the distributed register.

The operating environment may further comprise the distributed register database 300 which may be in operative communication with the distributed register nodes 402, 403, 404, and 405 of the distributed trust computing network 401. The distributed register database 300 may be a computing system that submits data to the nodes 402, 403, 404, and 405 in the form of proposed data records to be added to the distributed register. The distributed register database 300 may further be used to manage interjectors and receive notifications regarding the data within the distributed register. Accordingly, the distributed register database 300 may be one or more desktop computers, laptop computers, smartphones, tablets, smart devices, IoT devices, single board computers, or the like. In some embodiments, distributed register database 300 may be operated by a user within the entity. In other embodiments, the distributed register database 300 may automatically perform various functions to manage submitted or retrieved data or interjectors.

The submission and receipt of data between distributed register database 300 and the distributed trust computing network 401 may be achieved through one or more nodes described in FIG. 1 (e.g., the node 1, the node 2, or the like) and immediately processed for submission to the distributed register, such that that data hops or manual data touchpoints are reduced to preferably zero, allowing the system to maintain maximum integrity of data validation. The automated flow of permissioned ledger data allows the leveraging of distributed register technology and distributed register based services directly to entity side systems. The distributed register database 300 may be designed to provide access to data stored on the distributed register to third party systems as well. For instance, the third party system may comprise an overseeing entity conducting an investigation or study of data history or patterns within the data stored on the distributed register.

It should be understood by those having ordinary skill in the art that although the distributed register nodes 402, 403, 404, and 405, and/or the distributed register database 300 are depicted as single units, each of the depicted components, or sub-components therein, may represent multiple units. In some embodiments, a given computing system as depicted in FIG. 3 may represent multiple systems configured to operate in a distributed fashion. In other embodiments, the functions of multiple computing systems may be accomplished by a single system. For instance, the functions of the data monitoring system 106 may be accomplished by one or more of the distributed register nodes 402, 403, 404, and 405. It should further be understood that even though reference may be made to a single "distributed trust computing network 401," all singular usages of "distributed trust computing network" or "distributed register" may also refer to multiple distributed registers. For instance, separate distributed registers may be stored on the nodes 402, 403, 404, and 405 on a per-application or per-parameter basis.

Figure 5:
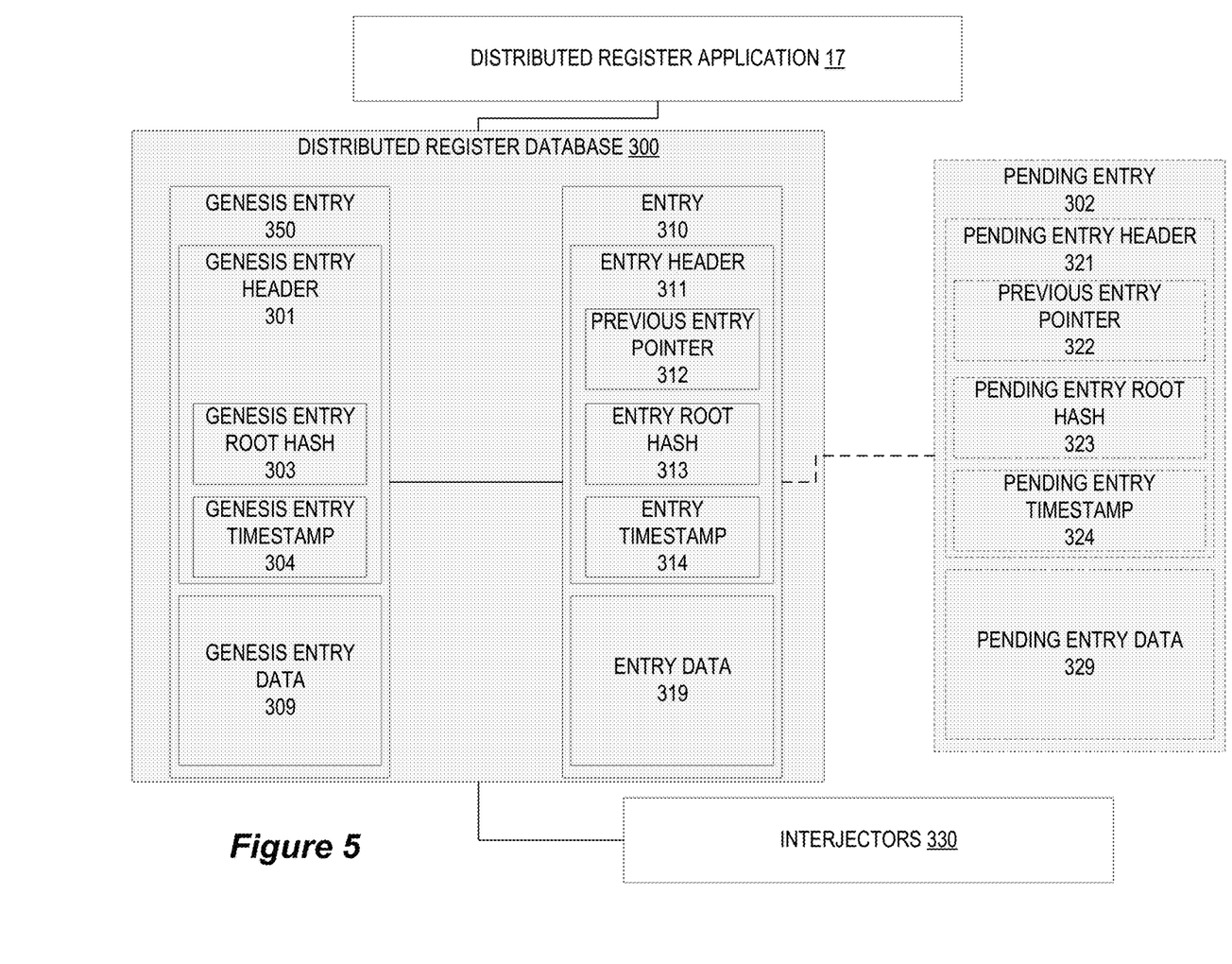
FIG. 5 is a block diagram illustrating the data flow between the structures of the brand element protection system, one or more nodes, and one or more entity systems, in accordance with some embodiments of the invention.

FIG. 5 is a block diagram illustrating the data structures within the distributed register database 300, in accordance with some embodiments of the invention. In particular, FIG. 5 depicts a plurality of entries within the distributed register database 300, in addition to a pending entry 302 that has been submitted to be appended to the distributed register database 300. The distributed register database 300 may comprise a genesis entry 350 that serves as the first entry and origin for subsequent entries in the distributed register database 300. The genesis entry 350, like all other entries within the distributed register database 300, comprise entry header 301 and entry data 309. The genesis entry data 309, or any other instances of entry data any entries in the distributed register database 300 may contain various data records.

The genesis entry header 301 may comprise various types of metadata regarding the genesis entry data 309. In some embodiments, the entry header 311 may comprise a genesis entry root hash 303, which is a hash derived from an algorithm using the genesis entry data 309 as inputs. In some embodiments, the genesis root hash 303 may be a Merkle root hash, wherein the genesis entry root hash 303 is calculated via a hash algorithm based on a combination of the hashes of each data record within the genesis entry data 309. In this way, any changes to the data within the genesis entry data 309 will result in a change in the genesis entry root hash 303. The genesis entry header 301 may further comprise a genesis entry timestamp 304 that indicates the time at which the entry was written to the distributed register database 300. In some embodiments, the timestamp may be a Unix timestamp. In some embodiments, particularly in distributed registers utilizing a proof-of-work ("PoW") consensus mechanism, the entry header 301 may comprise a nonce value and a difficulty value. The nonce value may be a whole number value that, when combined with a hash of the other items of metadata within the entry header 301, produces a hash output that satisfies the difficulty level of the cryptographic puzzle as defined by the difficulty value. For instance, the consensus mechanism may require that the resulting hash of the entry header 301 falls below a certain value threshold (e.g., the hash value must start with a certain number of zeroes, as defined by the difficulty value).

A subsequent entry 301 may be appended to the genesis entry 350 to serve as the next entry in the distributed register. Like all other entries, the entry 310 comprises an entry header 311 and entry data 319. Similarly, the entry header 311 comprise an entry root hash 313 of the data within the entry data 319 and an entry timestamp 314. The entry header 311 may further comprise a previous entry pointer 312, which may be a hash calculated by combining the hashes of the metadata (e.g., the genesis entry root hash 303, genesis entry timestamp 304, or the like) within the entry header 301 of the genesis entry 350. In this way, the entry pointer 312 may be used to identify the previous entry (i.e., the genesis entry 350) in the distributed register database 300, thereby creating a "chain" comprising the genesis entry 350 and the entry 301.

The value of a previous entry pointer is dependent on the hashes of the entry headers of all of the previous entries in the chain; if the entry data within any of the entries is altered, the entry header for the altered entry as well as all subsequent entries will result in different hash values. In other words, the hash in the entry header may not match the hash of the values within the entry data, which may cause subsequent validation checks to fail. Even if an unauthorized user were to change the entry header hash to reflect the altered entry data, this would in turn change the hash values of the previous entry pointers of the next entry in the sequence. Therefore, an unauthorized user who wishes to alter a data record within a particular entry must also alter the hashes of all of the subsequent entries in the chain in order for the altered copy of the distributed register to pass the validation checks imposed by the consensus algorithm. Thus, the computational impracticability of altering data records in a distributed register in turn greatly reduces the potential of improper alteration of data records.

A pending entry 302 or "proposed entry" may be submitted for addition to the distributed register database 300. The pending entry 302 may comprise a pending entry header 321, which may comprise a pending entry root hash 323, a previous entry pointer 322 that points to the previous entry 301, a pending entry timestamp 324, and pending entry data 329. Once a pending entry 302 is submitted to the system, the nodes within the system may validate the pending entry 302 via a consensus algorithm. The consensus algorithm may be, for instance, a proof of work mechanism, in which a node determines a nonce value that, when combined with a hash of the entry header 311 of the last entry in the distributed register, produces a hash value that falls under a specified threshold value. For instance, the PoW algorithm may require that said hash value begins with a certain number of zeroes. Once said nonce value is determined by one of the nodes in the distributed register, the node may post the "solution" to the other nodes in the distributed register. Once the solution is validated by the other nodes, the hash of the entry header 311 is included in the pending entry header 321 of the pending entry 302 as the previous entry pointer 322. The pending entry header 321 may further comprise the pending entry root hash 323 of the pending entry data 329 which may be calculated based on the winning solution. The pending entry 302 is subsequently considered to be appended to the previous entry 301 and becomes a part of the distributed register database 300. A pending entry timestamp 324 may also be added to signify the time at which the pending entry 302 is added to the distributed register database 300. In other embodiments, the consensus mechanism may be based on a total number of confirmations submitted by the nodes of the distributed register database 300 (e.g., a PBFT consensus mechanism). Once a threshold number of confirmations to validate the pending entry 302 has been reached, the pending entry 302 may be appended to the distributed register database 300. In such embodiments, nonce values and difficulty values may be absent from the entry headers.

The system described herein may use one of several different paradigms for entry creation. In some embodiments, an entry may be generated whenever new assessment parameters or applications are defined. In some embodiments, the system may wait to receive inputs for all known assessment parameters for all applications before generating an entry. In other embodiments, entries may be generated on a per-application basis. In yet other embodiments, new entries may be generated for each transaction that is processed or routed by the data monitoring system 106. Other possibilities exist, as the entity may select its entry generation methods based on striking a balance between computing efficiency and detailed record keeping over a period of time.

The brand element protection system 200, via the distributed register application 17, may submit a proposed data record to the distributed register database 300, where the proposed data record may comprise a new or updated brand element, brand element permission data, new or updated metadata regarding a brand element, transfer of ownership or custody of a brand element, or the like. Furthermore, because such data is added in time-stamped entries to the distributed register, the system is able to reliably and accurately recreate the authenticity, ownership state, or permitted uses of one or more brand elements tokenized on the distributed register database 300 at any particular point in time.

Each brand element may be assigned an identifier (e.g., a character string, hash value, numerical identifier, or the like). For instance, in some embodiments, brand elements may be labeled in numerical order. In other embodiments, the brand elements may be logged according to an existing entity team, subdivision, product, or the like. In still further embodiments, brand elements may be identified using a wallet address, private key information, user handle, combination of identifiers, or the like. The parameters used to log each account may also each be assigned a parameter identifier. For instance, the parameters may be numbered (e.g., Parameter 1, Parameter 2, or the like). Parameters may include, but are not limited to, tracking each particular brand element's description, file size, metadata, ownership or authorization history, application compatibilities, security information, permissible uses, certifications, resource transaction information, user interaction information, entity information, or the like.

In any embodiment, the brand element protection system 200 may, via the distributed register application 17, participate in validating proposed data records through a consensus algorithm, along with the nodes of the distributed register database 300. For example, a new parameter which coincides with a newly created brand element, transaction, change in metadata or ownership, user interaction, identified instance of use, or the like, may be proposed to be added to the distributed register database 300. The brand element protection system 200 may further ensure that the data to be entered possesses certain latency requirements, data file type requirements, or historical processing time, or the like. For instance, the system may receive data from data sources on a periodic basis that is not relatively time-sensitive and does not possess any specific latency requirements (e.g., brand element protection system 200 may ping one or more entity systems to receive an updated list of identified brand element uses once per day). If the required parameters are missing or cannot be corroborated from the received data, the brand element protection system 200 may either reject the proposed data record containing the data or delay validating the proposed data record until the missing inputs are provided. In other embodiments, the system may receive data from data sources on a periodic basis that is relatively time-sensitive and does possess specific latency requirements (e.g., brand element protection system 200 may ping one or more entity systems to receive real time brand element use requests, ownership history requests, custody information requests, or the like). In this case, the brand element protection system 200 may prioritize the data path of a node with the lowest latency for this specific data.

In some embodiments, the distributed register application 17 of the brand element protection system 200 may be used to define an initial set of parameters within the entry data (e.g., the genesis entry data 309) of an entry (e.g., the genesis entry 350) for each resource in the entity system. In such embodiments, when the brand element protection system 200 submits proposed data records to be appended to the distributed register database 300 in subsequent entries, the consensus algorithm may require that a parameter and resource has been defined in one of the previous entries in order for the proposed data record to be considered valid. For instance, if a proposed data record comprises an assessment for Resource Parameter 1 with respect to Resource 1, the system may first verify that the Resource Parameter 1 and Resource 1 have been defined in a previous entry (e.g., the genesis entry 350). If the definitions of the parameter and resource are not found, the proposed data record may be considered to be invalid. It should be noted that while parameters may be defined in the genesis entry 350, it is within the scope of the disclosure for new or updated parameters and/or resources to be defined in any entry within the distributed register database 300.

Over time, it may become necessary to adjust these processes in response to changes in the operating environment, entity requirements, technical advances, new security issues, changes in policies, or the like. In this regard, the system may use one or more interjectors 330 to cause a new entry to be created which contains the new tracking parameters, data, and/or metadata. "Interjector" may generally refer to the hardware and software implements that trigger the addition or updating of data within a new entry (e.g., the pending entry 302). In some embodiments, the interjector may be stored on the brand element protection system 200.

In other embodiments, the interjectors may be executed to add new entries or blocks to the distributed register database 300 which reference previously added entries or blocks. As such, as a dispute is identified, submitted, or otherwise initiated regarding a transaction for which an entry has already been made, the interjector 330 may later add an entry in "parallel" with a previous entry or block by referencing the prior entry or block in the information included in the new entry.

An interjector 330 may detect the existence of a condition that requires a change in the metadata, ownership data, permitted use data, or other type of data within the distributed register database 300. For example, the "condition" may be the identification of an instance of use of a particular bran element, a request for use of a brand element, a transfer of ownership of a brand element, or the like, which necessitates the gathering or updating formation stored on the distributed register. Upon detecting the condition, the interjector 330 may trigger the addition of new data records to the distributed register database 300 via the distributed register application 17 in order to fully prevent alteration of such data. In some embodiments, the system may recognize that further information is available regarding a previously entered data point, and may automatically request such data from one or more entities or users, and may refer back to a previously added data block via a work queue in order to enhance historical data with new information and context (e.g., a block entry number "N" may be added and appended a hash value of any number of alphanumerical characters, wherein certain characters, such as the last 2 characters of a hash string may indicate a particular work queue or parallel update of previous entry information). In this way, the data stored on the distributed register may be updated or expanded upon, but not overwritten, corrupted, or otherwise tampered with. As such, the system provides integrity, continuity, and security of data beyond that of conventional data storage or database systems.

In embodiments in which the new data records are added manually, the interjector 330 may send an alert or notification to the user through the data monitoring system 106, where the alert or notification prompts the user to enter the necessary information. The alert or notification may comprise a link (e.g., a hyperlink, or the like) that, when activated, opens a graphical interface on brand element protection system 200 (e.g., application portal 254, or the like) which provides graphical elements that allow the user to input the necessary information (e.g., image data, brand element data, identified metadata or uses, or the like). Once the user submits the necessary information, the brand element protection system 200 may submit a proposed data record to the distributed register database 300, where the proposed data record contains the information provided by the user to be incorporated into the distributed register. In embodiments in which the new data records are added automatically, the interjector 330 may cause the brand element protection system 200 to automatically retrieve brand element data (e.g., via agent 253, or the like), and submit the necessary information to the distributed register database 300 in the form of a proposed data record.

Various types of interjectors 330 may be used to trigger the addition of data records to the distributed register. For example, the interjectors 330 may include an "alert interjector" or a "dispute interjector" that triggers inputs of data relating to a newly identified problem, issue, instance of unauthorized brand element use, or the like. Furthermore, a "periodic interjector" may trigger reassessments after a threshold period of time has elapsed since a brand element has last been assessed (e.g., periodically retrieving ownership data, custody data, private key data, or the like), a "resolution interjector" which triggers data submission or retrieval based on a system recommended resolution, a user requested resolution, or an administrator's initiated resolution, a third party providing additional information regarding a request for permitted use of a brand element, or the like. It should be understood that the interjectors 330 described above are provided for exemplary purposes only, and that other types of interjectors 330 and/or triggers may be used depending on the entity's needs.

Figure 6:
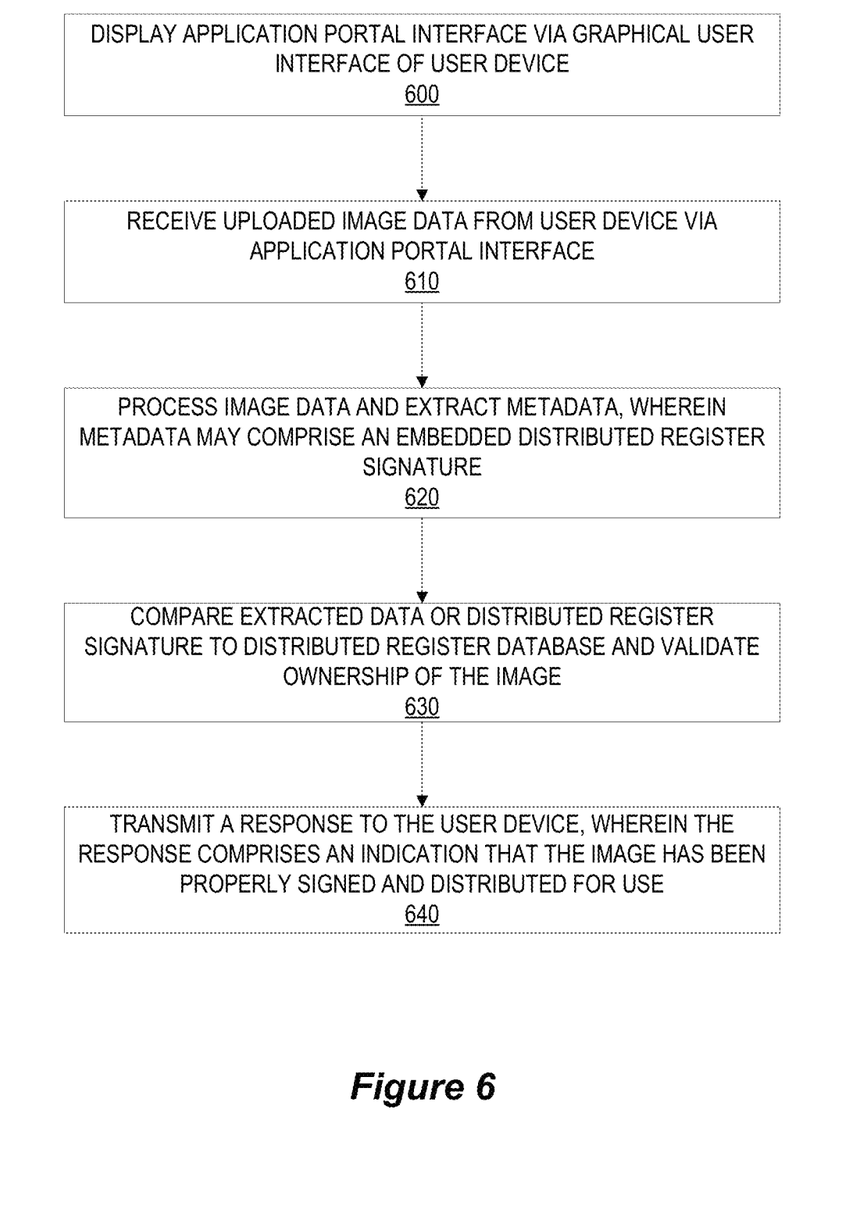
FIG. 6 is a flow diagram illustrating a process of utilizing the brand element protection system, in accordance with some embodiments of the invention.

FIG. 6 is a high-level process flow diagram illustrating a process using the brand element protection system, in accordance with one embodiment of the present disclosure. The process begins at block 600, wherein the brand element protection system 200 displays an application portal interface via a graphical user interface on one or more user devices 104. As discussed with regard to FIGS. 2 and 3, the application portal 254 may include a web portal or web interface 270, a mobile application 271, or otherwise some interface between the user device 104 and the brand element protection system 200 which allows an API data request to be submitted and automatically executed.

As shown in block 610, the process proceeds whereby the brand element protection system 200 receives uploaded image data 273 from the user device 104 via the application portal 254. In some embodiments, the user 102 may include additional information such as the location, web address, device, domain, or the like, where the image data 273 originated, an entity associated with the display of the image data 273, or the like (e.g., the image was located at "www.example.com" or the image data is displayed on a website belonging to "example entity"). In other embodiments, the user 102 may not transmit the image data 273 itself, but rather provide a link to the image data 273 such that the agent 253 of the brand element protection system 200 may retrieve the image data 273 directly from the source on which the image data 273 is being displayed.

As shown in block 620, the process continues wherein the brand element protection system 200 processes the uploaded image data 273 and extracts metadata, wherein the metadata may comprise an embedded distributed register or blockchain signature, such as image size, pixel data, file type, tokenized identifier (e.g., NFT data, or the like), ownership information (e.g., wallet address, or the like), custody information (e.g., wallet host or owner, or the like), location of access (e.g., URL, domain, display location, or the like), or the like.

As shown in block 630, the system may then compare the extracted metadata or distributed register/blockchain signature to the information contained in the distributed register database 300 in order to validate the ownership, custody, access rights, or the like, related to the image data. For instance, the brand element protection system 200 may query the distributed register database 300 for a specific NFT token corresponding to the image data, and may find that the image is owned, managed, or controlled by the managing entity system 500. In some instances, the distributed register database 300 may also contain a list of permitted third party systems 400 (e.g., entities, domains, companies, users, individuals, use cases, environments, or the like) in which the particular image data is permitted to be used.

Finally, as shown in block 640, the brand element protection system 200 may use the retrieved data from distributed register database 300 in order to transmit a response to the user device, wherein the response comprises an indication that the image data is properly signed and being used in a permissible manner. In some embodiments, the brand element protection system 200 may deduce that the image data is being used in an unauthorized or unpermitted manner, and may include a remedial recommendation within the response (e.g., the brand element protection system 200 may transmit a message that the issue of unauthorized or unpermitted use has been escalated for administrative review, may identify contact information of the domain, entity, or third party committing the unauthorized use, or the like).

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for brand element validation, the system comprising:
    at least one non-transitory storage device; and
    at least one processing device coupled to the at least one non-transitory storage device, wherein the at least one processing device is configured to:
        transmit information to a user device, wherein the information comprises display information for an application portal;
        receive uploaded image data from the user device via the application portal;
        process the received uploaded image data and extract metadata from the uploaded image data;
        utilizing a machine learning engine containing a machine learning dataset, compare the extracted metadata to data stored in a distributed register database comprising multiple nodes, wherein the distributed register database comprises a decentralized private blockchain storing brand element usage data including associated party, ownership information, permitted uses, and certificate values;
        based on comparison of the extracted metadata to the data stored in the distributed register database, validate ownership and permitted use of the uploaded image data and identify a percentage likelihood that a specific use of a brand element by a particular party in a particular manner either is or is not authorized based on the brand element usage data; and
        transmit a response to the user device via the application portal, wherein the response comprises an indication that the uploaded image data is permitted for use.

2. The system of claim 1, wherein the uploaded image data further comprises an image and a description of the usage of the image including location and one or more entity identifiers.

3. The system of claim 1, wherein metadata comprises an embedded distributed register or blockchain signature, image size, pixel data, file type, NFT identifier, wallet address, custody information, or location of access.

4. The system of claim 1, further configured to:
    based on comparison of the extracted metadata to the data stored in the distributed register database, fail to validate ownership and permitted use of the uploaded image data; and
    transmit an alternate response to the user device via the application portal, wherein the response comprises an indication that the uploaded image data is not permitted for use.

5. The system of claim 4, wherein the alternate response further comprises a message that unauthorized or unpermitted use has been escalated for administrative review.

6. The system of claim 1, wherein the system is further configured to transmit data between the system and the user device using end-to-end encryption.

7. The system of claim 1, wherein the uploaded image data further comprises a link to a website, domain, or location of one or more images.

8. A computer program product for brand element validation, the computer program product comprising at least one non-transitory computer-readable medium having computer-readable program code portions embodied therein, the computer-readable program code portions comprising:
    an executable portion configured for transmitting information to a user device, wherein the information comprises display information for an application portal;
    an executable portion configured for receiving uploaded image data from the user device via the application portal;

an executable portion configured for processing the received uploaded image data and extract metadata from the uploaded image data;

an executable portion configured for, utilizing a machine learning engine containing a machine learning dataset, comparing the extracted metadata to data stored in a distributed register database comprising multiple nodes, wherein the distributed register database comprises a decentralized private blockchain storing brand element usage data including associated party, ownership information, permitted uses, and certificate values;

an executable portion configured for, based on comparison of the extracted metadata to the data stored in the distributed register database, validating ownership and permitted use of the uploaded image data and identify a percentage likelihood that a specific use of a brand element by a particular party in a particular manner either is or is not authorized based on the brand element usage data; and an executable portion configured for transmitting a response to the user device via the application portal, wherein the response comprises an indication that the uploaded image data is permitted for use.

9. The computer program product of claim 8, wherein the uploaded image data further comprises an image and a description of the usage of the image including location and one or more entity identifiers.

10. The computer program product of claim 8, wherein metadata comprises an embedded distributed register or blockchain signature, image size, pixel data, file type, NFT identifier, wallet address, custody information, or location of access.

11. The computer program product of claim 8, the computer-readable program code portions further comprising:

an executable portion configured for, based on comparison of the extracted metadata to the data stored in the distributed register database, recognize a failure to validate ownership and permitted use of the uploaded image data; and an executable portion configured for transmitting an alternate response to the user device via the application portal, wherein the response comprises an indication that the uploaded image data is not permitted for use.

12. The computer program product of claim 11, wherein the alternate response further comprises a message that unauthorized or unpermitted use has been escalated for administrative review.

13. The computer program product of claim 8, wherein the system is further configured to transmit data between the system and the user device using end-to-end encryption.

14. The computer program product of claim 8, wherein the uploaded image data further comprises a link to a website, domain, or location of one or more images.

15. A computer-implemented method for brand element validation, the method comprising:

providing a computing system comprising a computer processing device and a non-transitory computer readable medium, wherein the computer readable medium comprises configured computer program instruction code, such that when said instruction code is operated by said computer processing device, said computer processing device performs the following operations:

transmitting information to a user device, wherein the information comprises display information for an application portal;

receiving uploaded image data from the user device via the application portal;

processing the received uploaded image data and extract metadata from the uploaded image data;

utilizing a machine learning engine containing a machine learning dataset, comparing the extracted metadata to data stored in a distributed register database comprising multiple nodes, wherein the distributed register database comprises a decentralized private blockchain storing brand element usage data including associated party, ownership information, permitted uses, and certificate values;

based on comparison of the extracted metadata to the data stored in the distributed register database, validating ownership and permitted use of the uploaded image data and identify a percentage likelihood that a specific use of a brand element by a particular party in a particular manner either is or is not authorized based on the brand element usage data; and transmitting a response to the user device via the application portal, wherein the response comprises an indication that the uploaded image data is permitted for use.

16. The computer-implemented method of claim 15, wherein the uploaded image data further comprises an image and a description of the usage of the image including location and one or more entity identifiers.

17. The computer-implemented method of claim 15, wherein metadata comprises an embedded distributed register or blockchain signature, image size, pixel data, file type, NFT identifier, wallet address, custody information, or location of access.

18. The computer-implemented method of claim 15, further configured to:

based on comparison of the extracted metadata to the data stored in the distributed register database, fail to validate ownership and permitted use of the uploaded image data; and transmit an alternate response to the user device via the application portal, wherein the response comprises an indication that the uploaded image data is not permitted for use.

19. The computer-implemented method of claim 18, wherein the alternate response further comprises a message that unauthorized or unpermitted use has been escalated for administrative review.

20. The computer-implemented method of claim 15, wherein the uploaded image data further comprises a link to a website, domain, or location of one or more images.

* * * * *